J. A. BUTTERWORTH.
WORM GEAR HOISTING MACHINERY.
APPLICATION FILED MAY 29, 1914.
1,128,754.
Patented Feb. 16, 1915.
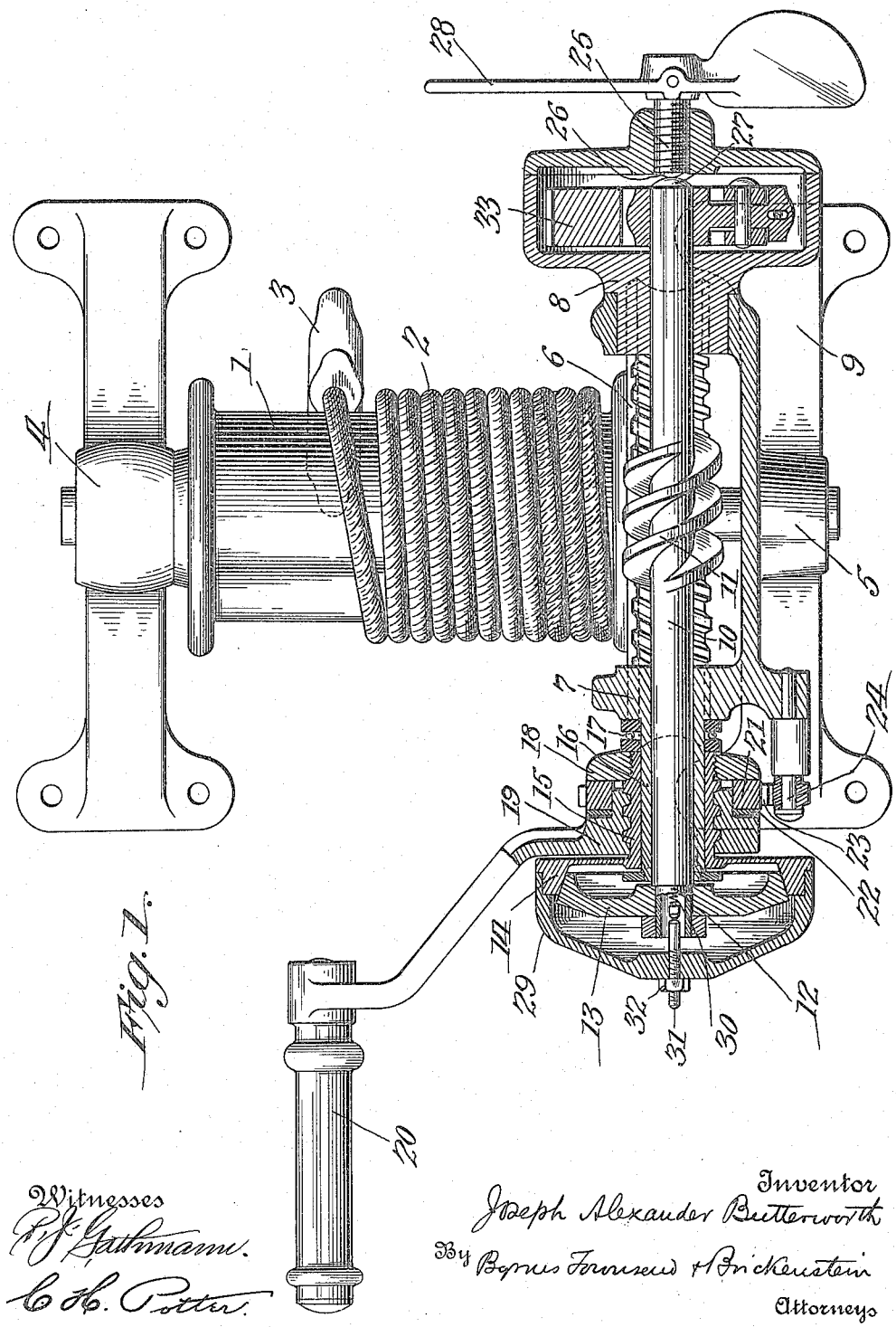

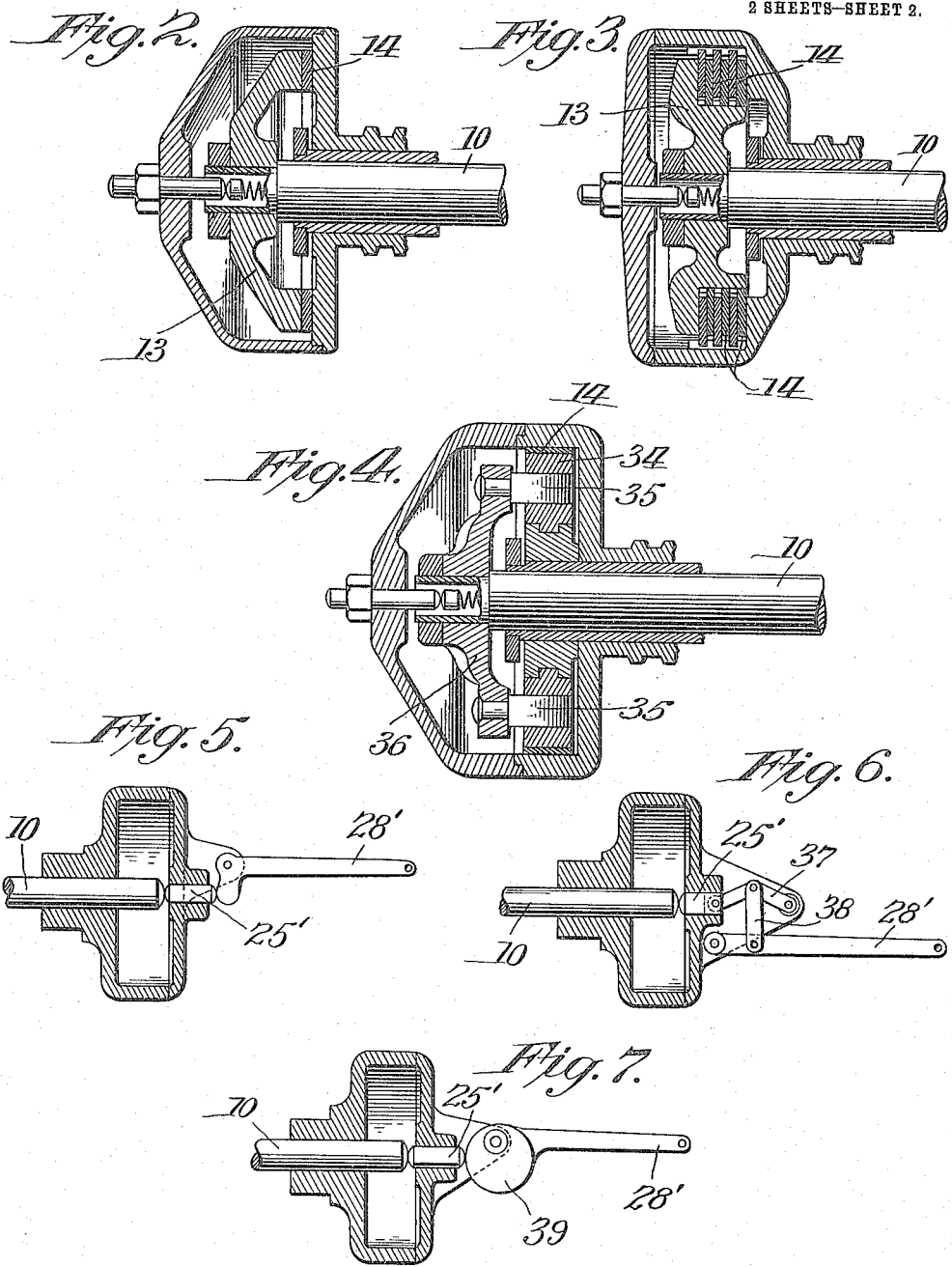

UNITED STATES PATENT OFFICE.

JOSEPH ALEXANDER BUTTERWORTH, OF LOUGHBOROUGH, ENGLAND, ASSIGNOR TO HERBERT MORRIS LIMITED, OF LOUGHBOROUGH, ENGLAND.

WORM-GEAR HOISTING MACHINERY.

1,128,754.   Specification of Letters Patent.   Patented Feb. 16, 1915.

Application filed May 29, 1914.   Serial No. 841,909.

*To all whom it may concern:*

Be it known that I, JOSEPH ALEXANDER BUTTERWORTH, a subject of the King of Great Britain, residing at Loughborough, Leicestershire, England, have invented certain new and useful Improvements in Worm-Gear Hoisting Machinery, of which the following is a specification.

This invention relates to hoisting machines, and particularly to the type in which the load is suspended by a rope wound around a drum, or a chain passing over a sprocket, the drum or sprocket being turned in the hoisting or lowering direction by a worm-wheel which is in turn operated by a worm on a shaft to which the operating handle, wheel, or other means is attached or geared.

It is desirable in this class of machines to insure, first, that the load shall be efficiently sustained, when hoisted, and yet be capable of being lowered through the operating means; second, that it shall be possible, when required, to lower the load rapidly under the influence of gravity; third, that during such rapid lowering the handle or other operating means will remain stationary; and fourth, that the pull required on the rope or chain, on which the load is suspended, to bring it down, shall be as small as, possible, to permit the rapid descent of light loads.

The object of the present invention is to provide a worm-gear hoisting machine having the foregoing qualifications.

An embodiment of the invention is illustrated in the accompanying drawings, in which,—

Figure 1 represents a plan view, partly in section, of a worm-geared winch, to which the invention is applied; Figs. 2, 3, and 4 are sectional views of various forms of clutches which may be used; and Figs. 5, 6, and 7 are sectional views of several arrangements for shifting the worm-shaft longitudinally.

As illustrated, the machine comprises an ordinary winding-drum 1, carrying the rope 2 having a load-suspending hook 3. Suitable bearings 4, 5 are provided, and near one end of the drum is secured thereon a worm-wheel 6. Mounted in bearings 7, 8 of the frame 9, is a transversely-disposed shaft 10 provided with a worm 11 arranged to mesh with the teeth of worm-wheel 6, and, as is obvious, the load suspended on hook 3 will induce a thrust between the teeth of the worm-wheel 6 and the worm 11 of the shaft 10. Secured on one end 12 of the shaft 10 is one element 13 of a clutch, the coöperating element 14 thereof being provided with a threaded sleeve 15 revolubly mounted on a reduced portion 16 of the bearing 7, a suitable thrust-bearing 17 being interposed between the sleeve 15 and the unreduced portion of the bearing 7. Formed or fixed upon the end of sleeve 15 is a thrust-washer 18, and upon the portion of the sleeve 15 nearest the clutch-element 14 is mounted the nut 19 of an operating device 20. The operating means shown is a crank-handle, but it will be understood that any device well known in the art might be substituted. Between the thrust-washer 18 and the nut 19 is a loosely mounted ratchet-ring 21, and between the inner face of the nut 19 and the outer face of the ring 21 is a suitable braking-surface 22, fixed to the nut 19. To prevent the turning of the ratchet-ring 21 except in the hoisting direction, a pawl 23, suitably pivoted in the frame at 24, is provided. The foregoing mechanism operates as a sustaining-brake, as will be presently understood. At the other end of the worm-shaft 10, there is located suitable means for moving the worm-shaft longitudinally to disengage the clutch-elements. As shown in Fig. 1, this means comprises a bolt 25, threaded into the end of the casing, the inner end 26 of the bolt abutting against the outer end 27 of the worm-shaft 10. The outer end of bolt 25 is provided with a suitable lever or handle 28 to facilitate turning the bolt.

The clutch-elements are suitably housed in a casing 29, and for the purpose of insuring sufficient pressure on the clutch-members 13 and 14 to permit driving the mechanism when there is no load on the hook to give the pressure required for that purpose, a light spring 30 is provided in the hollow end of the worm-shaft 10, which spring is adjusted by the threaded plug 31, having a nut 32.

For the purpose of controlling the speed of descent of the load, a suitable automatic centrifugal governor 33 may be mounted upon the worm-shaft 10.

The operation of the machine is as follows: In hoisting, the turning of the nut 19 of the operating means 20 tightens up the braking-surfaces 22 and the ratchet-ring 21 against the thrust-washer 18, whereupon the whole of the parts of the sustaining-brake turns together bodily on the stationary sleeve 16. The worm-shaft 10 is therefore rotated in the hoisting direction through the engagement of the clutch-members 13 and 14. When the hoisting operation ceases, the load tends to turn the brake in the reverse direction, but since the ratchet-ring 21 is held against rotation in this direction by the pawl 23, the turning of the brake as a body cannot take place on account of the friction induced between the friction-surface 22, the sides of the ratchet-ring 21, and the thrust-washer 18; the friction-surfaces of these members being of ample proportions to prevent such turning. To lower by hand, the operating means 20 is turned in the reverse direction to first move the nut 19 outward on the threaded sleeve 15, when the pressure on the braking surfaces will be relieved, this serving to allow the brake, and consequently the worm-shaft 10 engaged therewith, to turn in the lowering direction. To lower by gravity, the worm-shaft 10 is moved axially to disengage the clutch-members 13 and 14 by turning the threaded bolt 25 inward against the outer end 27 of the worm-shaft 10. The sustaining-brake being no longer coupled to the load, the load is free to descend rapidly, turning the worm-shaft 10 in the lowering direction. The hoisting-means 20, being disengaged from the worm-shaft 10, remains stationary during such rapid descent of the load.

It is not essential that the brake be of the screw-type, as illustrated, as any brake which will be applied by the torque of the worm-shaft 10 acting through the clutch-members 13 and 14 may be substituted for this screw-brake. Also, the clutch-members 13 and 14 are not necessarily of the cone-type, as illustrated. Any clutch, the engagement of which can be brought about by the axial pull or pressure in the worm-shaft may be employed for the purpose of engaging the shaft with the sustaining-brake. Fig. 2 shows a single plate-clutch for this purpose. Fig. 3 illustrates a multiple-disk clutch, the elements 14 of which are pressed together by the member 13 on the worm-shaft 10. Fig. 4 shows an expanding-clutch, the engagement-members 34 and 14 of which are pressed together by the action of wedges 35 fixed to a yoke 36 mounted on the worm-shaft 10.

Other means than that shown for causing the axial movement of the worm-shaft 10 may be adopted. For instance, as shown in Fig. 5, a pin 25' is moved against the end of the shaft 10 by pressing downward on the long arm of the bellcrank-lever 28'. In the means illustrated in Fig. 6, the pin 25' can be pressed inward against shaft 10 by means of the toggles 37, operated by the lever 28', through a link 38. In Fig. 7, the eccentric 39 presses the pin 25' against the end of the shaft 10 when the lever 28' is pulled downward.

I claim:—

1. In a hoisting-machine, a revoluble load-supporting member, a shaft revoluble with said member and arranged to receive an axial thrust from said load, a clutch-member on said shaft, a second clutch-member arranged to engage the first clutch-member and means for rotating the same, and a frictional brake-member interposed between the second clutch-member and the rotating means.

2. In a hoisting-machine, a revoluble load-supporting member, a shaft revoluble with said member and arranged to receive an axial thrust from said load, a clutch-member on said shaft, a second clutch-member arranged to engage the first clutch-member and means for rotating the same, a frictional brake-member interposed between the second clutch-member and the rotating means, and means for moving said shaft axially against the thrust from the load to disengage said clutch-members.

3. In a hoisting-machine, a revoluble load-supporting member, a shaft revoluble with said member and arranged to receive an axial thrust from said load, a clutch-member on said shaft, operating means for the machine, a sustaining-brake adapted to be controlled by said operating means, a clutch-member on said sustaining-brake arranged to engage the first clutch-member, and means for moving said shaft axially against the thrust from the load to disengage said clutch-members.

4. In a hoisting-machine, a revoluble load-supporting member, a shaft revoluble with said member and arranged to receive an axial thrust from the load, a sleeve rotatable about said shaft, a thrust-washer secured to said sleeve, operating means for turning said sleeve, means for mechanically connecting said shaft and said sleeve, frictional means between said thrust-washer and said operating means to form therewith and with said sleeve a sustaining-brake when the operating means is turned in the hoisting direction, and means for uncoupling said sustaining-brake when the operating means is turned in the lowering direction.

5. In a hoisting-machine, a revoluble load-supporting member, a shaft revoluble with said member and arranged to receive an axial thrust from the load, a clutch-member on said shaft, a sleeve rotatable about said shaft, a clutch-member on said sleeve arranged to engage the first clutch-member, a thrust-washer secured to said sleeve, operating means for turning said sleeve, frictional means between said thrust-washer and said operating means to form therewith and with said sleeve a sustaining-brake, and means for moving the shaft axially against the thrust from the load to disengage said clutch-members.

6. In a hoisting-machine, a revoluble load-supporting drum, a worm-wheel revoluble with said drum, a shaft having a worm in engagement with the teeth of said worm-wheel, a clutch-member on said shaft, operating means for the machine, a sustaining-brake adapted to be controlled by said operating means; a clutch-member on said sustaining-brake adapted to be held normally in engagement with the first clutch-member by the axial thrust induced in the worm-shaft by the pressure of the teeth of said worm-wheel on said worm, and means for moving said shaft axially in the direction opposite to that of the thrust from the load to disengage said clutch-members.

7. In a hoisting-machine, a revoluble load-supporting drum, a worm-wheel revoluble with said drum, a shaft having a worm in engagement with the teeth of said worm-wheel, a clutch-member on said shaft, a sleeve rotatable about said shaft, a clutch-member on said sleeve adapted to be held normally in engagement with the first clutch-member by the axial thrust induced in the worm-shaft by the pressure of the teeth of said worm-wheel on said worm, a thrust-washer secured to said sleeve, operating means for turning said sleeve, frictional means between said thrust-washer and said operating means to form therewith and with said sleeve a sustaining-brake, and means for moving said shaft axially against the thrust from the load to disengage said clutch-members.

8. In a hoisting-machine, a revoluble load-supporting member, a shaft revoluble with said member and arranged to receive an axial thrust from the load, a clutch-member on said shaft, a sleeve rotatable about the bearing of said shaft, a clutch-member on said sleeve adapted to be held normally in engagement with the first clutch-member by the axial thrust, a thrust-washer secured to said sleeve, operating means for turning said sleeve, a ring interposed between and adapted to frictionally bind said thrust-washer and said operating means when the latter is turned in the hoisting direction, means for preventing rotation of said ring when the operating means is moved in the lowering direction, means for disengaging said thrust-washer, ring, and operating means when the latter is turned in the lowering direction, and means for moving the worm-shaft axially against the thrust from the load to disengage said clutch-members.

9. In a hoisting-machine, a revoluble load-supporting drum, a worm-wheel revoluble with said drum, a shaft having a worm in engagement with the teeth of said worm-wheel, a clutch-member on said shaft, a sleeve rotatable about the bearing of said shaft, a clutch-member on said sleeve adapted to be held normally in engagement with the first clutch-member by the axial thrust induced in said shaft by the pressure of the teeth of said worm-wheel on said worm, a thrust-washer secured to said sleeve, operating means for turning said sleeve, a ratchet-ring interposed between and adapted to frictionally bind said thrust-washer and said operating means when the latter is turned in the hoisting direction, a pawl for preventing rotation of said ring when the operating means is moved in the lowering direction, means for disengaging said thrust-washer, ratchet-ring, and operating means when the latter is turned in the lowering direction, and means for moving the worm-shaft axially against the thrust from the load to disengage said clutch-members.

In testimony whereof I affix my signature in presence of two witnesses.

JOSEPH ALEXANDER BUTTERWORTH.

Witnesses:
R. SPRIGGS,
M. E. WIGG.

Copies of this patent may be obtained for five cents each, by addressing the "Commissioner of Patents, Washington, D. C."